(12) United States Patent
Jaiswal

(10) Patent No.: US 8,682,640 B2
(45) Date of Patent: Mar. 25, 2014

(54) SELF-CONFIGURING LANGUAGE TRANSLATION DEVICE

(75) Inventor: Peeyush Jaiswal, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 714 days.

(21) Appl. No.: 12/626,529

(22) Filed: Nov. 25, 2009

(65) Prior Publication Data

US 2011/0125486 A1 May 26, 2011

(51) Int. Cl.
*G06F 17/28* (2006.01)

(52) U.S. Cl.
USPC .......................................... 704/2; 704/3; 704/8

(58) Field of Classification Search
USPC .......................................................... 704/2–8
See application file for complete search history.

(56) References Cited

U.S. PATENT DOCUMENTS

| | | | |
|---|---|---|---|
| 6,385,586 B1 | 5/2002 | Dietz | |
| 7,272,377 B2 * | 9/2007 | Cox et al. | 455/403 |
| 7,386,437 B2 | 6/2008 | Brulle-Drews | |
| 7,689,408 B2 * | 3/2010 | Chen et al. | 704/8 |
| 7,925,497 B2 * | 4/2011 | Takahashi | 704/8 |
| 8,036,875 B2 * | 10/2011 | Nakashima et al. | 704/3 |
| 8,073,677 B2 * | 12/2011 | Furihata et al. | 704/2 |
| 2002/0059056 A1 * | 5/2002 | Appleby | 704/4 |
| 2002/0111788 A1 * | 8/2002 | Kimpara | 704/2 |
| 2003/0125927 A1 * | 7/2003 | Seme | 704/3 |
| 2003/0202683 A1 | 10/2003 | Ma et al. | |
| 2004/0102956 A1 * | 5/2004 | Levin | 704/2 |
| 2004/0122656 A1 | 6/2004 | Abir | |
| 2004/0176960 A1 * | 9/2004 | Shpiro et al. | 704/277 |
| 2005/0192714 A1 | 9/2005 | Fong et al. | |
| 2006/0224378 A1 * | 10/2006 | Chino et al. | 704/2 |
| 2007/0099602 A1 | 5/2007 | Kurlander et al. | |
| 2007/0294076 A1 | 12/2007 | Shore et al. | |
| 2008/0077384 A1 * | 3/2008 | Agapi et al. | 704/2 |
| 2008/0221862 A1 * | 9/2008 | Guo et al. | 704/2 |
| 2009/0048820 A1 * | 2/2009 | Buccella | 704/2 |
| 2009/0070098 A1 * | 3/2009 | Patryshev | 704/3 |
| 2009/0070102 A1 * | 3/2009 | Maegawa | 704/9 |
| 2009/0083023 A1 | 3/2009 | Foster et al. | |
| 2009/0204398 A1 * | 8/2009 | Du et al. | 704/231 |
| 2009/0210214 A1 * | 8/2009 | Qian et al. | 704/2 |
| 2009/0299727 A1 * | 12/2009 | Fux et al. | 704/4 |
| 2009/0319257 A1 * | 12/2009 | Blume et al. | 704/7 |
| 2010/0198578 A1 * | 8/2010 | Tachimori | 704/2 |
| 2010/0299147 A1 * | 11/2010 | Stallard | 704/235 |

OTHER PUBLICATIONS

Preuss et al., "Digital Voice Processing", Astronautics & Aeronautics, Jan. 1983, pp. 44-46.

\* cited by examiner

*Primary Examiner* — Douglas Godbold
(74) *Attorney, Agent, or Firm* — Yee & Associates, P.C.; John R. Pivnichny

(57) ABSTRACT

An apparatus comprises an input device, a language processing unit, and a translation unit. The input device is configured to receive an oral statement. The language processing unit is configured to convert the oral statement into data and to analyze the data to identify a particular language of the oral statement. The translation unit is configured to provide a translation of the oral statement in response to identifying the particular language of the oral statement.

22 Claims, 8 Drawing Sheets

SELF-CONFIGURING LANGUAGE TRANSLATION DEVICE

BACKGROUND

1. Field

The disclosure relates generally to systems and methods for language translation, and more particularly, to systems and methods for translating speech among a plurality of languages. Still more specifically, the present disclosure relates to a method and system for a self-configuring language translation device.

2. Description of the Related Art

The need for translation of communications among different languages has increased in recent years. Commerce and travel among different regions of the world has increased and so too has the need for language translation. In the world today there are thousands of different languages. In some regions of the world, people may speak several different languages in several different dialects. Ordinarily, translation requires the use of a translator capable of speaking and understanding at least two different languages. In recent years, translation dictionaries and devices using translation dictionaries have aided in the translation of communications among different languages and dialects.

SUMMARY

According to one embodiment of the present invention, an apparatus comprises an input device, a language processing unit, and a translation unit. The input device may be configured to receive an oral statement spoken in the vicinity of the input device. The language processing unit may be configured to convert the oral statement into data and to analyze the data to identify a particular language of the oral statement. The translation unit may be configured to provide a translation of the oral statement in response to identifying the particular language of the oral statement.

In another embodiment of the present invention, a method for translating oral statements is present. The method comprises receiving an oral statement by a device; converting the oral statement into data; analyzing the data by a processing unit connected to the device to identify a particular language of the oral statement; and providing a translation of the oral statement in response to identifying the particular language of the oral statement.

In another embodiment of the present invention, a computer program product comprises a computer readable storage medium storing a plurality of instructions for translating statements. The instructions, stored on the computer readable storage medium, include instructions for receiving an oral statement at a device, instructions for converting the oral statement into data, instructions for analyzing the data to identify a particular language of the oral statement, and instructions for providing a translation of the oral statement in response to identifying the particular language of the oral statement.

The features, functions, and advantages can be achieved independently in various embodiments of the present invention or may be combined in yet other embodiments in which further details can be seen with reference to the following description and drawings.

BRIEF DESCRIPTION OF THE SEVERAL VIEWS OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

DETAILED DESCRIPTION

Figure 1:
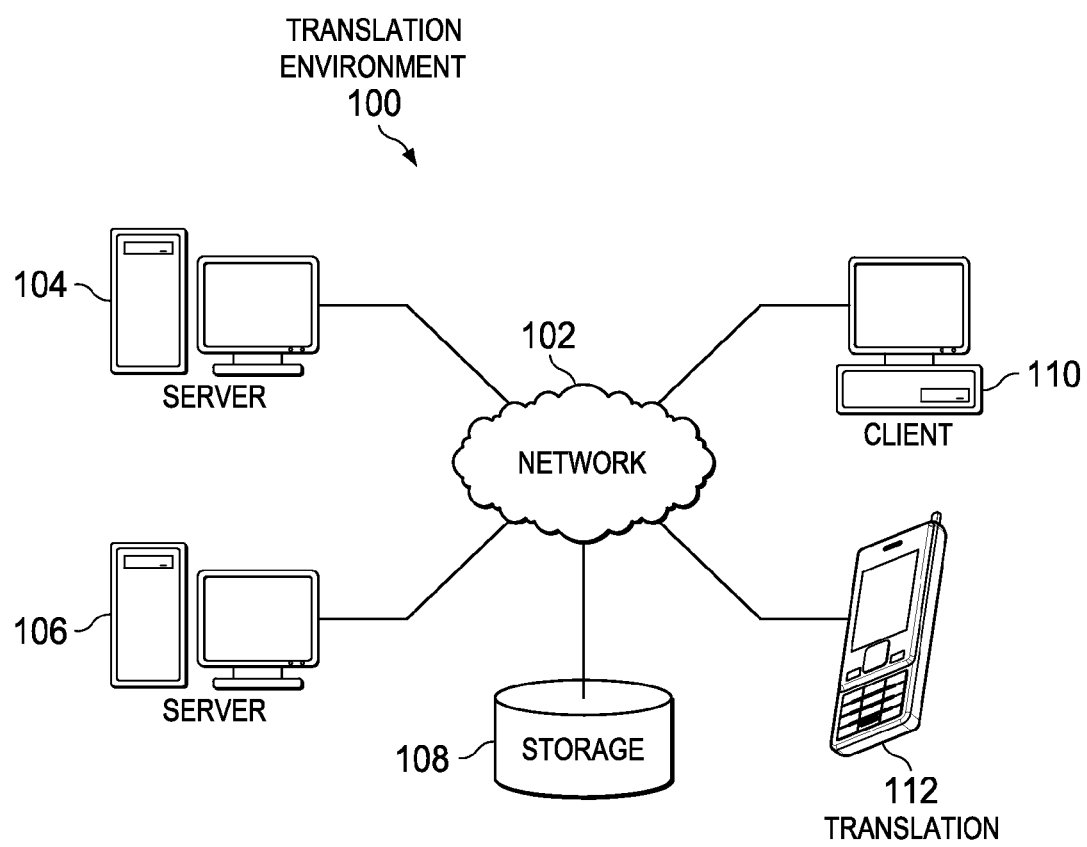
FIG. 1 is a pictorial representation of a translation environment in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to FIG. 1, a pictorial representation of a translation environment in which an illustrative embodiment may be implemented. Translation environment 100 is a network of computing devices in which the illustrative embodiments may be implemented. Translation environment 100 contains network 102, which is the medium used to provide communication links between various devices and computers connected together within translation environment 100. Network 102 may include connections, such as wire, wireless communication links, or fiber optic cables.

In the depicted example, server 104 and server 106 connect to network 102 along with storage unit 108. In addition, client 110 connects to network 102. Client 110 may be, for example, a personal computer or a network computer. In the depicted example, server 104 provides information, such as boot files, operating system images, and applications to client 110. Client 110 is a client to server 104 in this example. Translation device 112 is also a client device that may exchange information with client 110. Translation device 112 also may exchange information with server 104 and/or server 106. Translation device 112 may exchange data with different computers through a wireless communications link when available. Translation device may also exchange data with different computers through a wire communication link. Translation environment 100 may include additional servers, clients, and other devices not shown.

Program code located in translation environment 100 may be stored on a computer recordable storage medium and downloaded to a data processing system or other device for use. For example, program code may be stored on a computer recordable storage medium on server 104 and downloaded to client 110 and/or translation device 112 over network 102 for use on translation device 112.

In the depicted example, translation environment 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, translation environment 100 also may be implemented as a number of different types of networks, such as for example, an intranet, a local area network (LAN), or a wide area network (WAN). FIG. 1 is intended as an example, and not as an architectural limitation for the different illustrative embodiments.

Figure 2:
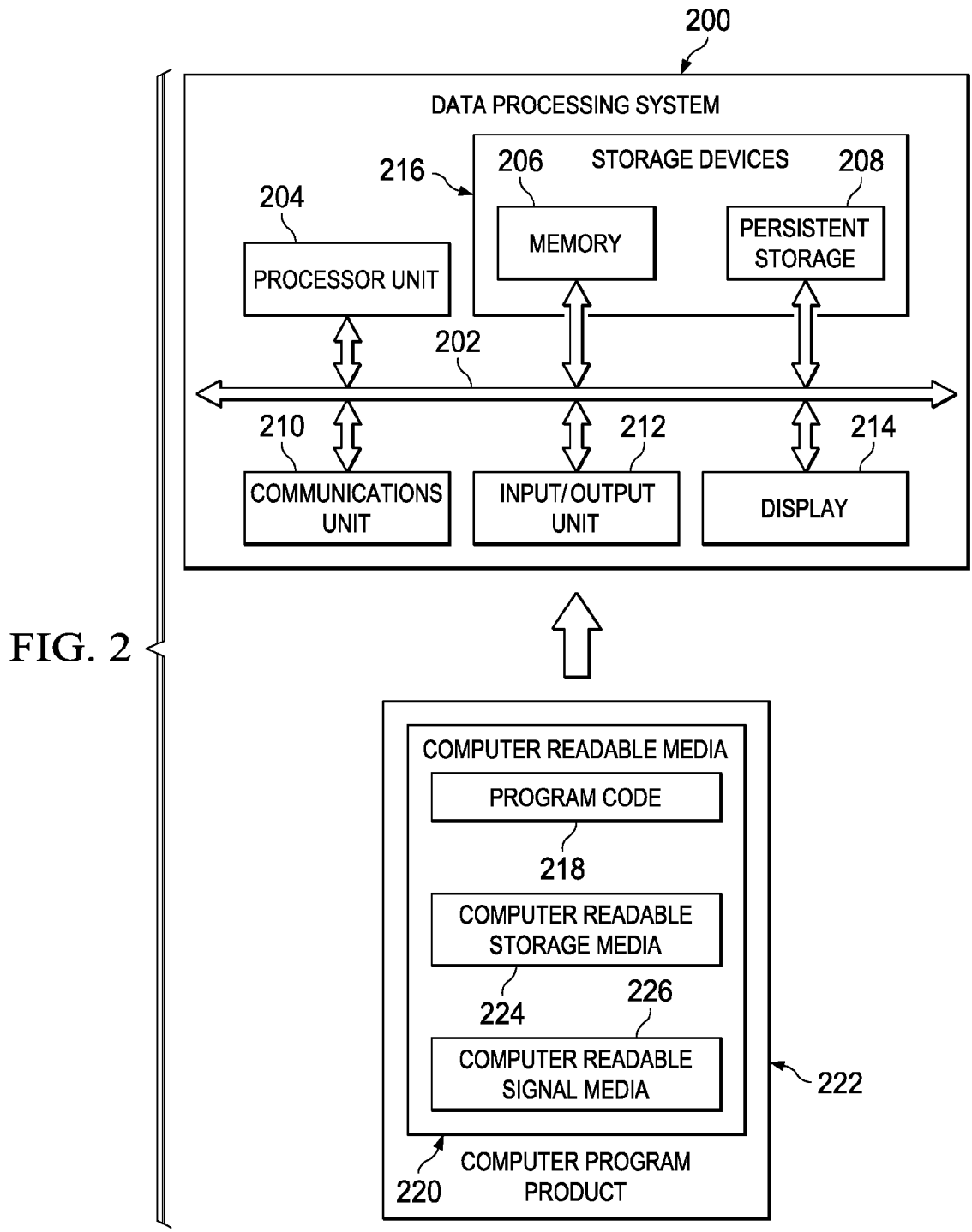
FIG. 2 is a diagram of a data processing system in accordance with an illustrative embodiment.

With reference now to FIG. 2, a diagram of a data processing system is depicted in accordance with an illustrative embodiment. Data processing system 200 is an example of a computer, such as server 104, client 110, or translation device 112 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communication links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

FIGS. 1-2 are intended as examples, and not as architectural limitations for the different embodiments. It should be appreciated that FIGS. 1-2 are only exemplary and are not intended to assert or imply any limitation with regard to the environments in which different embodiments may be implemented. Many modifications to the depicted environments may be made.

The different illustrative embodiments recognize and take into account a number of different considerations. For example, the different illustrative embodiments recognize and take into account that a translation device may not be configured to translate a statement into the proper language. The different illustrative embodiments recognize that one solution may involve using a translation device connected to a positioning system and a database linking certain languages to certain locations. However, different people in the same location may speak different languages. Translation devices using positioning systems and databases may be incapable of determining the specific language spoken by a person in the location. Thus, without being able to determine the proper language, such a translation device may not be able to translate communications between the user and other persons. Further, a user of such a translation device may also be incapable of determining the language spoken by the person. Thus, the user may not know if the translation device is properly translating communications.

The different illustrative embodiments further recognize and take into account that a translation device may not be able to translate all information conveyed in a statement. For example, translation of a statement in one language to a statement into another language may not convey the mood of, or tone used by, the speaker. The translated statement may only convey just a word by word translation of the oral statement spoken by the speaker.

Thus, the different illustrative embodiments provide a method and apparatus for a self-configuring language translation device. In one illustrative embodiment, an apparatus comprises an input device, a language processing unit, and a translation unit. The input device is configured to receive an oral statement. The language processing unit is configured to convert the oral statement into data and to analyze the data to identify a particular language of the oral statement. The translation unit is configured to provide a translation of the oral statement in response to identifying the particular language of the oral statement.

The different illustrative embodiments further provide an apparatus comprising a positioning system and a language database. The positioning system is configured to determine a location of the input device. The language database is configured to store data associated with a plurality of languages and a number of locations that each of the plurality of languages are spoken. The language processing unit is configured to search the language database to identify the particular language based on the oral statement and the location of the input device. The language processing unit is configured to update the language database with a new location of the particular language in response to identifying the new location of the particular language.

The different illustrative embodiments further provide an apparatus comprising user interface and a biometrical device. The user interface is configured to provide the translation of the oral statement. The translation of the oral statement may be provided in at least one of a text display and an audio display. The biometrical device is configured to determine a voice inflection of the oral statement and to provide the voice inflection of the oral statement in the user interface. The voice inflection may be provided in a visual display or an audio display.

Figure 3:
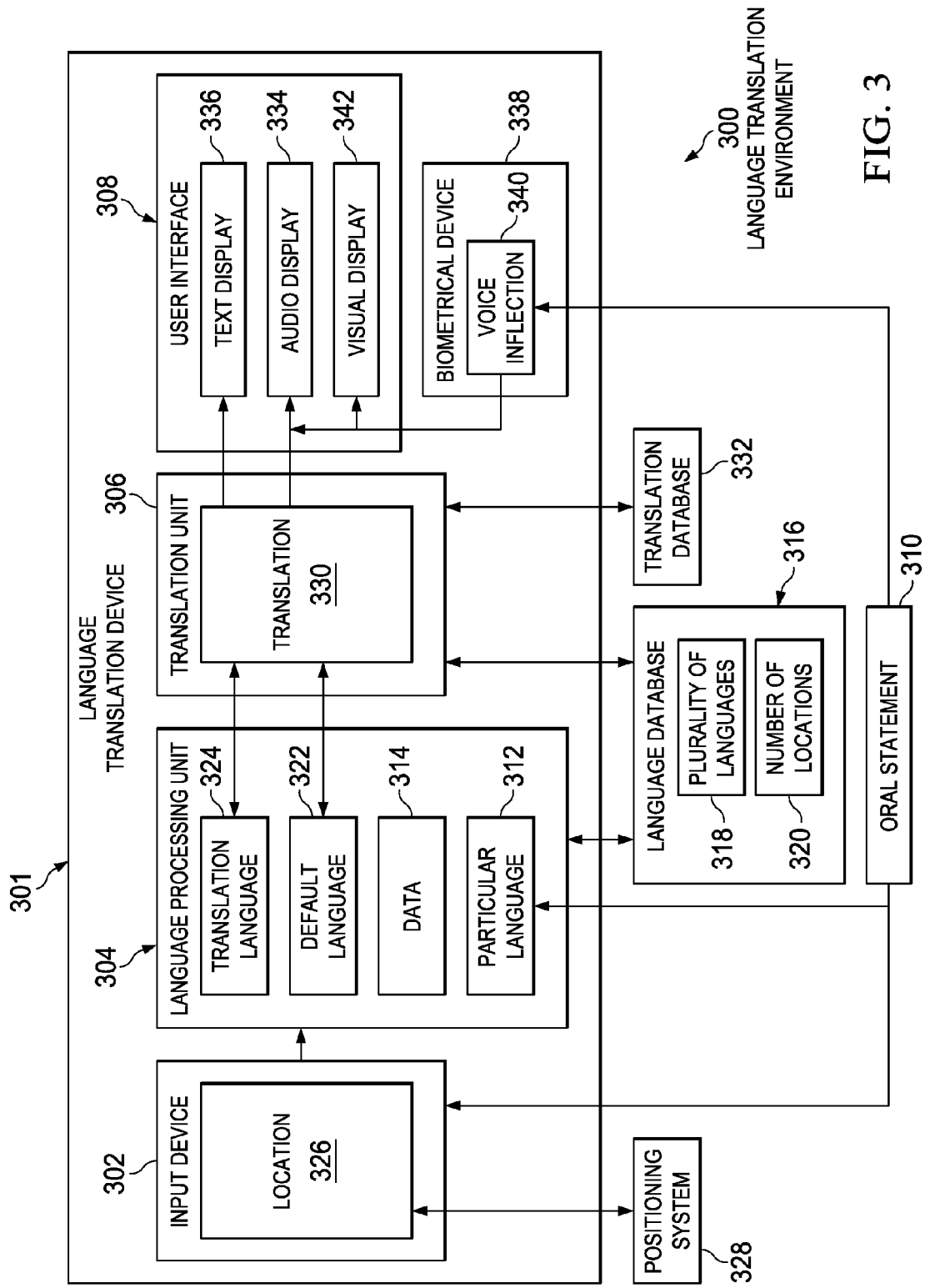
FIG. 3 is a block diagram of a language translation environment in accordance with an illustrative embodiment.

With reference now to FIG. 3, an illustration of a block diagram of a language translation environment is depicted in accordance with an illustrative embodiment. Language translation environment 300 may be an example of translation environment 100 in FIG. 1. Language translation environment 300 includes language translation device 301. In this example, language translation device 301 includes input device 302, language processing unit 304, translation unit 306 and user interface 308. Language translation device 301 may be an example of one implementation of translation device 112 in FIG. 1.

In this illustrative example, input device 302 receives oral statement 310. For example, input device 302 may be a transmitter and/or a microphone for receiving sound waves. Oral statement 310 may be a sound, a word and/or a plurality of words uttered by a person. As used herein, a plurality, when referring to items, is at least more than one item. In this example, oral statement is spoken in particular language 312. Oral statement 310 is in the form of sound waves that are received by input device 302. Input device 302 may convert oral statement 310 from sound waves to an electrical signal, and transmit the electrical signal to language processing unit 304. Input device 302 may also send the oral statement directly to language processing unit 304.

Language processing unit 304 receives oral statement 310 from input device 302. When received by language processing unit 304, oral statement 310 may be in the form of sound waves or an electrical signal. Language processing unit 304 converts oral statement 310 into data 314. Language processing unit 304 analyses data 314 to identify particular language 312 of oral statement 310. For example, language processing unit 304 may access information from language database 316 to determine particular language 312 of oral statement 310. In the conversion of oral statement 310 into data 314 and the analysis of data 314, language processing unit 304 may use a number of data processing components. For example, language processing unit 304 may include and/or be connected to a data processing system, such as data processing system 200 in FIG. 2.

As depicted, language database 316 contains plurality of languages 318 and number of locations 320. As used herein, a number, when referring to items, is one or more items. In this example, number of locations 320 is a geographic region or regions where each of plurality of languages 318 is spoken. Number of locations 320 may be countries, states, cities, areas defined by geographic coordinates, and/or any portion thereof. Plurality of languages 318 in language database 316 may include any and all known languages and/or dialects. Thus, for each language of plurality of languages 318 language database 316 contains number of locations 320 that each language of plurality of languages 318 is spoken.

In this illustrative example, language processing unit 304 has default language 322 and translation language 324. Default language 322 may be a language selected to have statements translated into. For example, a user may naturally speak and understand default language 322. The user may prefer to have statements from other persons translated into default language 322. Thus, default language 322 may be selected to have statements received by input device 302 not in default language 322 translated into default language 322.

In this depicted example, translation language 324 may be a language to have statements from the user translated into. For example, a user may wish to have statements spoken by the user in default language 322 translated into translation language 324 so that persons other than the user may understand the statements. Translation language 324 may also be a number of translation languages. For example, a user may wish to have statements spoken by the user in default language 322 translated into a number of translation languages so that a number of other persons speaking different languages may understand the statements.

Translation language 324 may be selected by a user input, determined based upon location 326 of input device 302 and/or determined by language processing unit 304. For example, if a user is in a particular region where residents of the region are known to speak a certain language, the user may select translation language 324 to be the certain language spoken in the particular region by an input. Translation language 324 may be based upon location 326 of input device 302. In this example, language processing unit 304 uses positioning system 328 to determine location 326 of input device 302. Language processing unit 304 may then access information from language database 316 to determine a language of plurality of languages 318 spoken in location 326 of input device 302 to be translation language 324. In this example, positioning system 328 may be a global positioning system (GPS) and/or any other suitable system for determining the location of a device. Global positioning systems are old and well known in the art.

In this illustrative example, translation language 324 may also be determined by language processing unit 304. As discussed, language processing unit 304 is configured to identify particular language 312 of oral statement 310. Language processing unit 304 may then determine whether particular language 312 is the same language as default language 322. Upon determining that particular language 312 is not the same language as default language 322, language processing unit 304 may then automatically update translation language 324 to be particular language 312. For example, translation language 324 may have previously been selected based upon a user input or based upon location 326 of input device 302. Language processing unit 304 may automatically update the previous selection of translation language 324 with particular language 312. In this manner, translation language 324 for language translation device 301 may be automatically configured based upon the determination of particular language 312 of oral statement 310. As used herein, automatically configured and/or updated, when referring to a device, is a device that is capable of being configured and/or updated without user intervention.

Further, language processing unit 304 may provide validation that a previous selection of translation language 324 is correct. Language processing unit 304 may determine that particular language 312 is the same language as translation language 324. Upon such a determination, translation language 324 will remain unchanged. Language processing unit 304 may then send a validation signal to user interface 308.

In some illustrative embodiments, language processing unit 304 may be configured to automatically update language database 316 with additional locations that languages of plurality of languages 318 are spoken. For example, language processing unit 304 may determine location 326 of input device 302 is a new location that particular language 312 is spoken. Originally, language database 316 may not have included location 326 in number of locations 320 for particular language 312. Thus, language processing unit 304 may update language database 316 with location 326 in number of locations 320. This update provides a new location that particular language 312 is spoken. As language database 316 continues to be updated, the information contained in language database 316 may become more reliable and/or useful. Continued updating of language database 316 may also provide greater information about languages spoken in the different parts of the world.

In these examples, translation unit 306 is configured to provide translation 330 of oral statement 310 in user interface 308. Translation unit 306 receives oral statement 310 and/or oral statement 310 converted into data 314 from language processing unit 304. Translation unit 306 also receives instructions from language processing unit 304 to translate oral statement 310 into one of translation language 324 and default language 322. As discussed previously, language processing unit 304 may determine whether particular language 312 is the same language as default language 322. For example, if the languages are the same, language processing unit 304 may send instructions to translation unit 306 to translate oral statement 310 into translation language 324. If the languages are not the same, language processing unit 304 may send instructions to translation unit 306 to translate oral statement 310 into default language 322. In translating oral statement 310, translation unit 306 may access translation database 332. For example, translation database 332 may contain a plurality of translations for a plurality of words in a plurality of languages. Translation unit 306 may also search translation database 332 to provide translation 330 of oral statement 310.

In these illustrative examples, translations device 306 may provide translation 330 in user interface 308 in one of audio display 334 and text display 336. User interface 308 may include a speaker to provide audio display 334 of translation 330. For example, audio display 334 may be an audible translation of oral statement 310. User interface 308 may also include a display screen for displaying text display 336 of translation 330. For example, text display 336 may be a textual translation of oral statement 310.

In some illustrative embodiments, language translation device 301 may also include biometrical device 338. Biometrical device 338 may be a device capable of determining characteristics about a speaker of an oral statement such as oral statement 310. For example, biometrical device 338 may analyze sound waves associated with oral statement 310. Biometrical device 338 may be capable of determining characteristics, such as, for example, without limitation, the age, the gender, the mood, the tone, voice inflection 340 and/or any other characteristics associated with the speaker.

In this example, voice inflection 340 may contain information regarding the mood of, and/or the tone used, by the speaker of oral statement 310. Biometrical device 338 may provide voice inflection 340, information of oral statement 310 in user interface 308 in one of audio display 334 and visual display 342. For example, audio display 334 may be an audible translation of oral statement 310 having a tone and/or voice inflection 340 similar to that of oral statement 310 prior to translation. Audio display 334 may also be an audible message informing the user of the mood of the speaker of oral statement 310. Also for example, visual display 342 may be a textual message, color, symbol, and/or any other suitable display to inform the user of voice inflection 340 of the speaker or oral statement 310.

The illustration of language translation environment 300 in FIG. 3 is not meant to imply physical or architectural limitations to the manner in which different advantageous embodiments may be implemented. Other components in addition to, and/or in place of, the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in one illustrative embodiment, language translation device 301 may not include language processing unit 304, translation unit 306, and/or biometrical device 338. For example, input device 302 may send oral statement 310 to a network connected device such as server 104 and/or client 110 in FIG. 1 by a wireless connection. Processing and/or translation of oral statement 310 by language processing unit 304 and/or translation unit 306 may take place outside of language translation device 301. Translation unit 306 may then provide translation 330 to user interface 308 by a wireless connection. Yet in other illustrative embodiments, language translation device may not require a wireless connection to translate oral statement 310 and/or automatically configure language translation device 301. For example, language database 316 and/or translation database 332 may be stored entirely, or in relevant portion in, language translation device 301. Thus, translation of oral statement 310 and/or configuration of language translation device 301 may occur in situations where a wireless connection is not available and/or practical.

Figure 4:
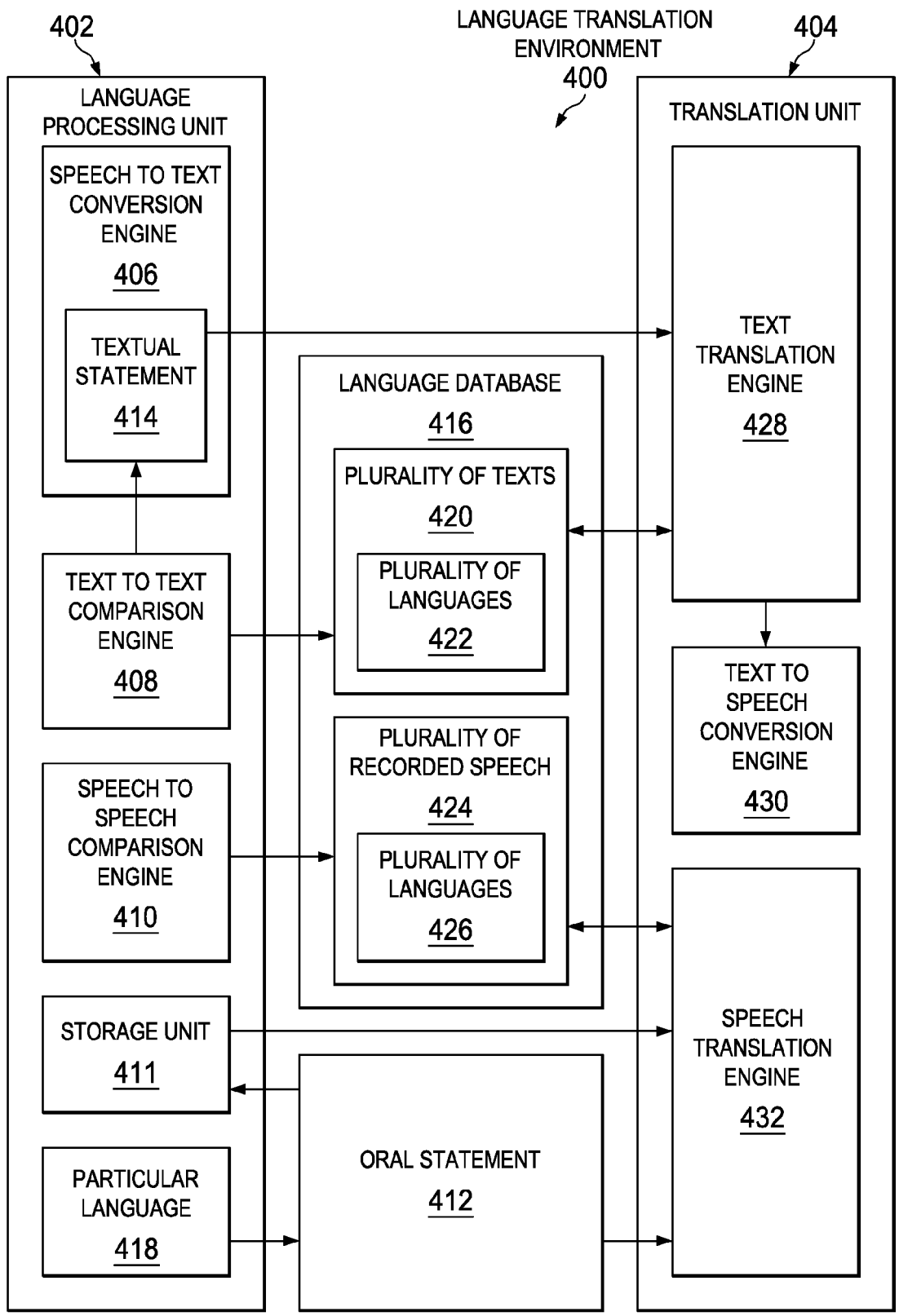
FIG. 4 is a block diagram of a language translation environment in accordance with an illustrative embodiment.

With reference now to FIG. 4, an illustration of a block diagram of a language translation environment is depicted in accordance with an illustrative embodiment. Language translation environment 400 may be an example of one implementation of translation environment 100 in FIG. 1. As depicted, language translation environment 400 includes language processing unit 402 and translation unit 404. Language processing unit 402 and translation unit 404 may be examples of implementations of language processing unit 304 and translation unit 306 in FIG. 3.

In this illustrative example, language processing unit 402 includes speech to text conversion engine 406, text to text comparison engine 408, speech to speech comparison engine 410, and storage unit 411. Language processing unit 402 receives oral statement 412. Oral statement 412 may be a plurality of sound waves or an electrical signal when received by language processing unit 402. Language processing unit 402 may store oral statement in storage unit 411. Speech to text conversion engine 406 converts oral statement 412 into textual statement 414. Speech to text conversion engine 406 may use a plurality of recorded sounds in a given language having associated textual symbols in the given language to convert oral statement 412 into textual statement 414.

In one example, text to text comparison engine 408 may access language database 416 to determine particular language 418 of oral statement 412. Language database 416 contains plurality of texts 420 in plurality of languages 422. Text to text comparison engine 408 may compare textual statement 414 to plurality of texts 420 in plurality of languages 422 to determine particular language 418.

In another example, speech to speech comparison engine 410 may access language database 416 to determine particular language 418 of oral statement 412. Language database 416 may further contain plurality of recorded speech 424 in plurality of languages 426. Speech to speech comparison engine 410 may compare oral statement 412 to plurality of recorded speech 424 in plurality of languages 426 to determine particular language 418.

In an illustrative example, translation unit 404 includes text translation engine 428, text to speech conversion engine 430, and speech translation engine 432. Translation unit 404 may translate oral statement 412 using text translation engine 428. In this example, text translation engine 428 receives textual statement 414 and particular language 418 from language processing unit 402. Text translation engine 428 then accesses language database to translate oral statement 412. Text translation engine 428 may compare textual statement 414 to plurality of tests 420 in language database 416. Text translation engine 428 may then translate textual statement 414 from particular language 418 to one of plurality of languages 422 to form a textual translation of oral statement 412.

In one example, translation unit 404 may provide the textual translation of oral statement 412 in a text form. Alternatively, text to speech conversion engine 430 may convert the textual translation of oral statement 412 into an audio translation. Text to speech conversion engine 430 may perform this conversion using techniques similar to those used by speech to text conversion engine 406 in language processing unit 402. Translation unit 404 may provide the audio translation of oral statement 412 in an audio form.

In an illustrative example, translation unit 404 may translate oral statement 412 using speech translation engine 432. In this example, speech translation engine 432 receives oral statement 412 and particular language 418 from language processing unit 402. Speech translation engine 432 then accesses language database to translate oral statement 412. Speech translation engine 432 may compare oral statement 412 to plurality of recorded speech 424 in language database 416. Speech translation engine 432 may then translate oral statement 412 from particular language 418 to one of plurality of languages 426 to form an audio translation of oral statement 412. Translation unit 404 may then provide the audio translation of oral statement 412 in an audio form. Alternatively, speech to text conversion engine 406 may convert the audio translation of oral statement 412 into a textual translation. Translation unit 404 may then provide the textual translation of oral statement 412 in a text form.

The illustration of language translation environment 400 in FIG. 4 is not meant to imply physical or architectural limitations to the manner in which different advantageous embodiments may be implemented. Other components in addition to, and/or in place of, the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, text to speech conversion engine 430 may be located in language processing unit 402. All conversion between speech and text may occur in language processing unit 402. In another example, in language processing unit 402 may receive a textual statement to be translated. The textual statement may be converted into an audio statement by text to speech conversion engine 430. The textual statement may be translated by translation engine unit 404 as either a textual or audio statement.

Figure 5:
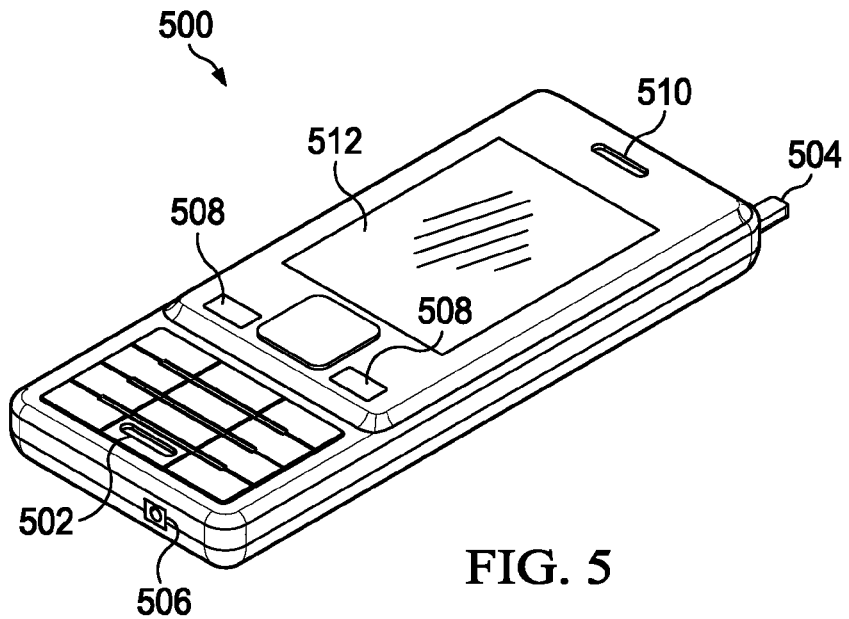
FIG. 5 is an pictorial representation of a language translation device in accordance with an illustrative embodiment.

With reference now to FIG. 5, an illustration of a language translation device is depicted in accordance with an illustrative embodiment. Language translation device 500 may be an example of an embodiment of language translation device 301 in FIG. 3. In this example, language translation device 500 may be a handheld wireless device. For example, without limitation, language translation device 500 may also be implemented in a personal digital assistant, a wireless telephone, a landline telephone, a computer, a web camera, a headset, a radio, and/or any other suitable communication device.

As depicted, language translation device 500 includes transmitter 502, wireless connection 504, wire connection 506, user inputs 508, speaker 510 and display screen 512. Transmitter 502 may be an example of input device 302 in FIG. 3. Transmitter 502 may receive an oral statement. Language translation device 500 may include a language processing unit and a translation unit such as language processing unit 304 and translation unit 306 in FIG. 3. Alternatively, wireless connection 504 may send the oral statement to a data processing system such as data processing system 200 in FIG. 2. Wireless connection 504 may also connect to a database such as language database 316 and/or translation database 332 in FIG. 3. Language translation device 500 may also use wire connection 506 for any and all functions performed by wireless connection 504. In this illustrative example, user inputs 508 may be used to control the operation of language translation device 500 and send user inputs to language translation device 500.

In this example, speaker 510 and display screen 512 provide visual, text, and/or audio displays. Speaker 510 and display screen 512 may be examples of implementations of user interface 308 in FIG. 3. For example, speaker 510 may provide translation 330 of oral statement 310 in audio display 334 in FIG. 3. Also speaker 510 may provide voice inflection 340 of oral statement 310 in audio display 334 in FIG. 3. Display screen 512 may provide translation 330 of oral statement 310 in text display 336 in FIG. 3. Also display screen 512 may provide voice inflection 340 of oral statement 310 in visual display 342 in FIG. 3.

Figure 6:
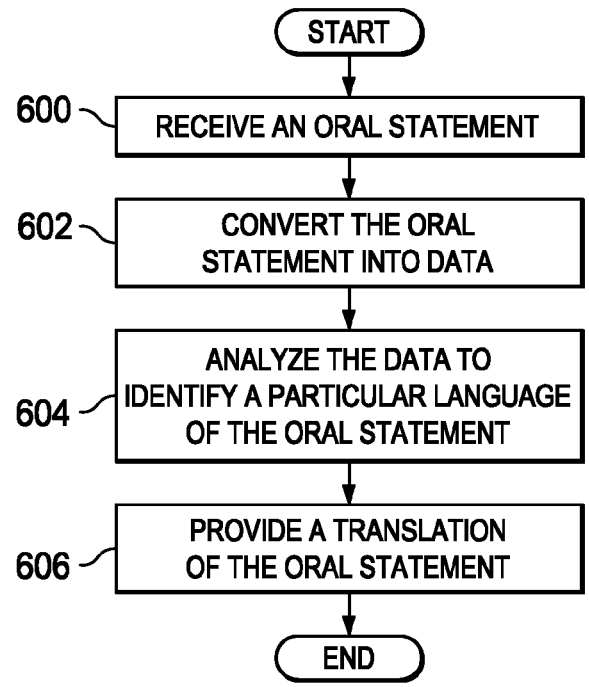
FIG. 6 is a flowchart of a process for translating oral statements in accordance with an illustrative embodiment.

With reference now to FIG. 6, an illustration of a flowchart of a process for translating oral statements is depicted in accordance with an illustrative embodiment. The process illustrated in FIG. 6 may be implemented in a language translation environment, such as language translation environment 300 in FIG. 3.

The process begins by receiving an oral statement (operation 600). In operation 600, the oral statement may be a plurality of sound waves. The sound waves may be received by an input device such as input device 302 in FIG. 3. The process then converts the oral statement into data (operation 602). In operation 602, a language processing unit such as language processing unit 304 in FIG. 3 may convert the oral statement into data. The data may be an electrical signal representing the sound waves of the oral statement. The data may also be a textual representation of the oral statement.

Thereafter, the process analyzes the data to identify a particular language of the oral statement (operation 604). In operation 604, a language processing unit such as language processing unit 304 in FIG. 3 may analyze the data. For example, the language processing unit may access a language database such as language database 316 in FIG. 3 to identify the particular language of the oral statement. The process then provides a translation of the oral statement (operation 606), with the process terminating thereafter. In operation 606, a translation unit such as translation unit 306 in FIG. 3 may provide the translation of the oral statement. For example, the translation unit may access a translation database such as translation database 332 in FIG. 3, to provide the translation of the oral statement. Further, the translation of the oral statement may be provided in a user interface such as user interface 308 in FIG. 3.

Figure 7:
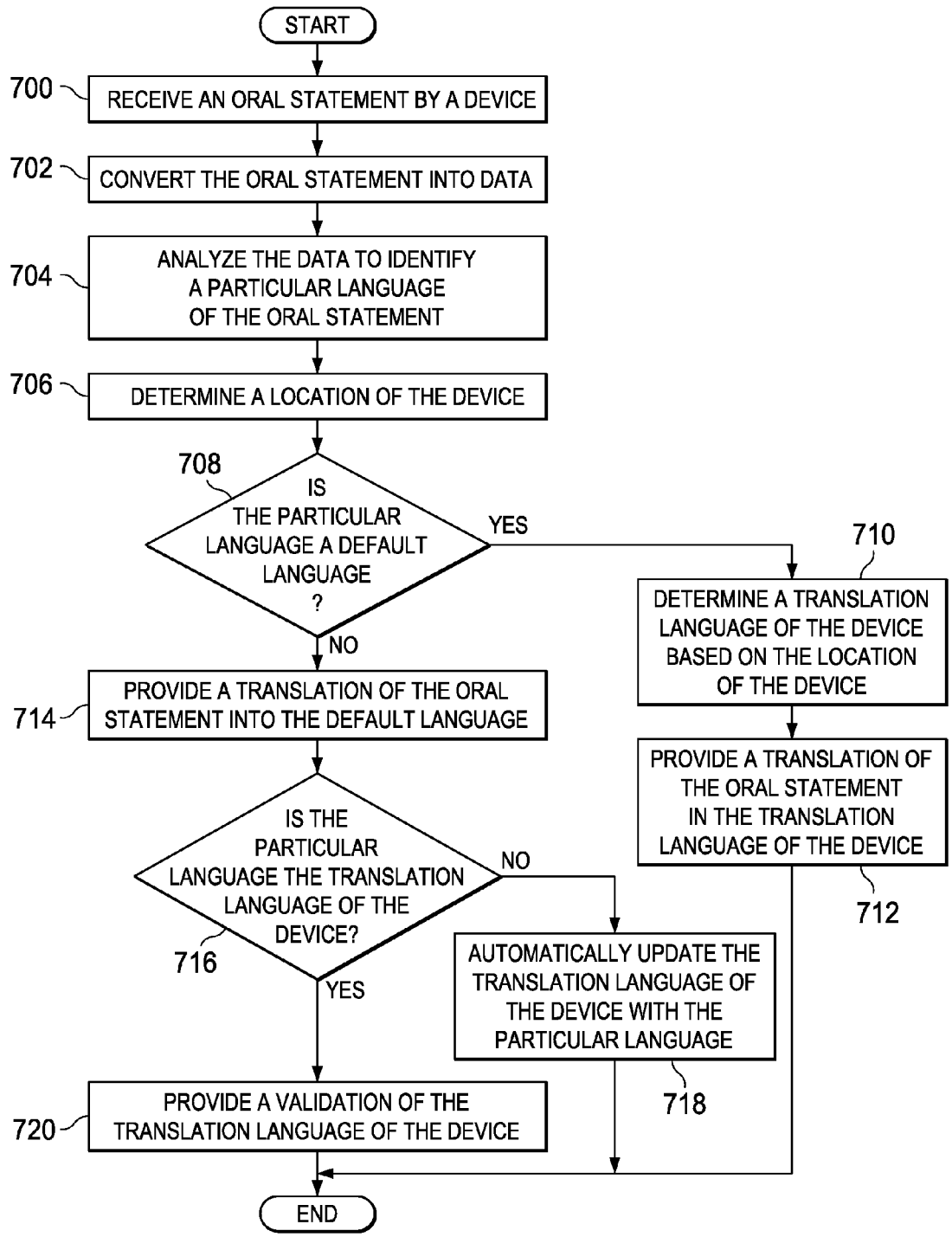
FIG. 7 is a flowchart of a process for automatically configuring a translation device in accordance with an illustrative embodiment.

With reference now to FIG. 7, an illustration of a flowchart of a process for automatically configuring a translation device is depicted in accordance with an illustrative embodiment. The process illustrated in FIG. 7 may be implemented in a language translation environment, such as language translation environment 300 in FIG. 3. The process begins by receiving an oral statement by a device (operation 700). The process then converts the oral statement into data (operation 702). Thereafter, the process analyzes the data to identify a particular language of the oral statement (operation 704). Operations 700, 702, and 704 may be examples of implementations of operations 600, 602, and 604 in FIG. 6.

The process then determines a location of the device (operation 706). In operation 706, the process may use a positioning system such as positioning system 328 in FIG. 3 to determine the location of the device. Thereafter, the process determines whether the particular language is a default language (operation 708). In operation 708, a language processing unit such as language processing unit 304 in FIG. 3 may compare the particular language with the default language to determine if the languages are the same. The default language may be a preselected language spoken and understood by a user.

If a determination is made that the particular language is the default language, the process then determines a translation language of the device based on the location of the device 710. In operation 710, the language processing unit may access a language database such as language database 316 in FIG. 3 to determine the translation language of the device. The process then provides a translation of the oral statement in the translation language of the device (operation 712), with the process terminating thereafter. In operation 712, a translation unit such as translation unit 306 in FIG. 3 may provide the translation of the oral statement in the translation language of the device. For example, the translation unit may access a translation database as translation database 332 in FIG. 3 to provide the translation of the oral statement. Further, the translation of the oral statement may be provided in a user interface such as user interface 308 in FIG. 3.

If a determination is made that the particular language is not the default language, the process then provides a translation of the oral statement in the default language (operation 714). In operation 714, the translation unit such as translation unit 306 in FIG. 3 may provide the translation of the oral statement in the translation language of the device. For example, the translation unit may access a translation database as translation database 332 in FIG. 3 to provide the translation of the oral statement. Further, the translation of the oral statement may be provided in a user interface such as user interface 308 in FIG. 3. Thereafter, the process determines whether the particular language is the translation language of the device (operation 716). In operation 716, a language processing unit such as language processing unit 304 in FIG. 3 may compare the particular language with the translation language of the device to determine if the languages are the same. For example, the translation language may be initially selected by a user. The translation language may also be initially determined based upon a location of the device, such as in operation 710.

If a determination is made that the particular language is not the translation language of the device, the process then automatically updates the translation language of the device with the particular language (operation 718), with the process terminating thereafter. In operation 718, a language processing unit such as language processing unit 304 in FIG. 3 may automatically configure the translation language of the device. If a determination is made that the particular language is the translation language of the device, the process then provides a validation of the translation language of the device (operation 720), with the process terminating thereafter. In operation 720, the language processing unit may provide the validation. For example, the validation may be a signal. The signal may be may be provided to a user in a user interface such as user interface 308 in FIG. 3.

Figure 8:
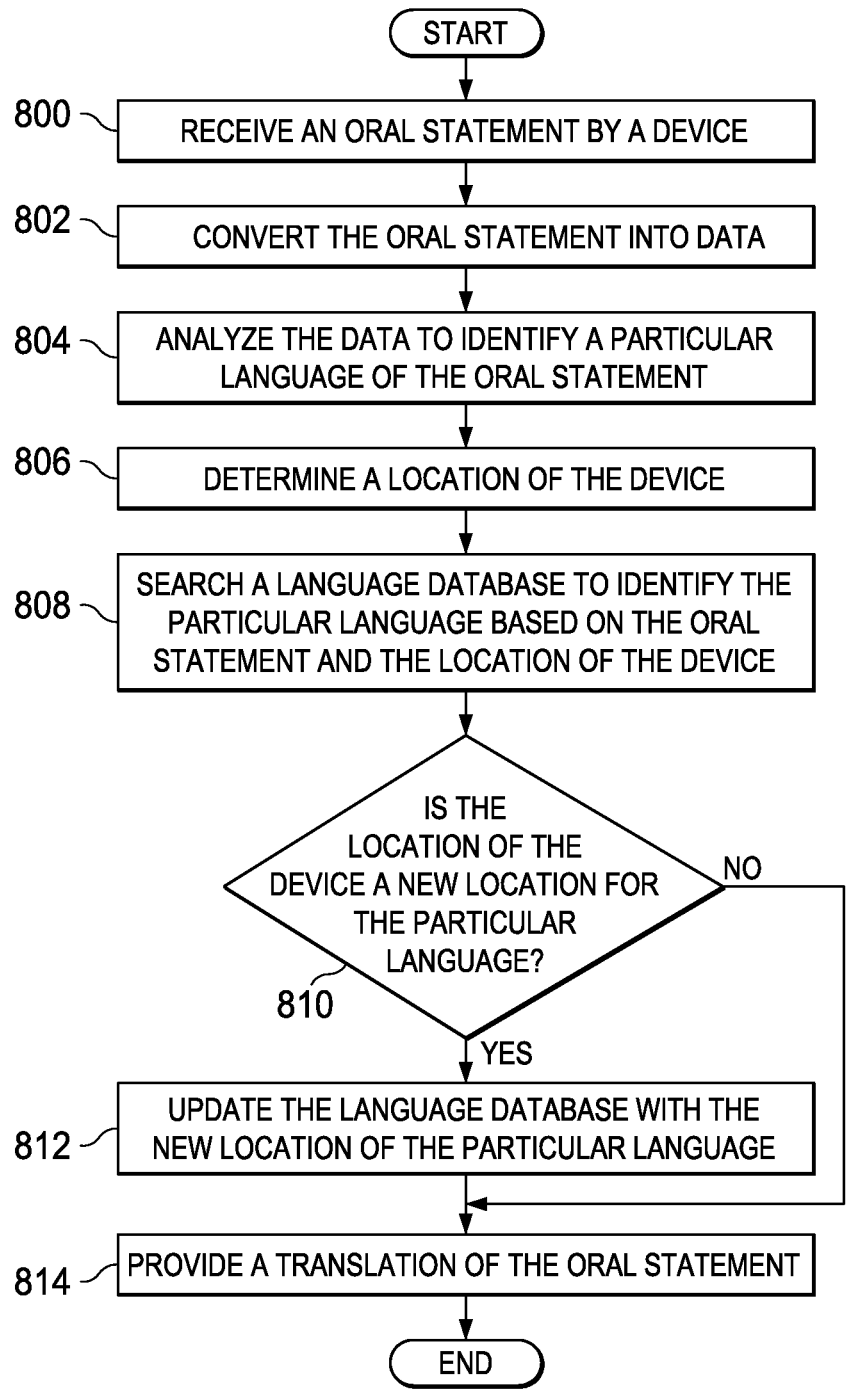
FIG. 8 is a flowchart of a process for updating a language database in accordance with an illustrative embodiment.

With reference now to FIG. 8, an illustration of a flowchart of a process for updating a language database is depicted in accordance with an illustrative embodiment. The process illustrated in FIG. 8 may be implemented in a language translation environment, such as language translation environment 300 in FIG. 3. The process begins by receiving an oral statement by a device (operation 800). The process then converts the oral statement into data (operation 802). Thereafter, the process analyzes the data to identify a particular language of the oral statement (operation 804). Operations 800, 802, and 804 may be examples of implementations of operations 600, 602, and 604 in FIG. 6.

The process then determines a location of the device (operation 806). In operation 806, the process may use a positioning system such as positioning system 328 in FIG. 3 to determine the location of the device. Thereafter, the process searches a language database to identify the particular language based on the oral statement and the location of the device (operation 808). In operation 808, a language processing unit such as language processing unit 304 in FIG. 3 may search the language database to identify the particular language of the oral statement. The language database may contain a plurality of recorded speech and a plurality of texts in a plurality of languages such as language database 416 in FIG. 4.

The process then determines whether the location of the device is a new location for the particular language (operation 810). In operation 810, the language processing unit may access a language database such as language database 316 in FIG. 3. For example, the language database may contain a plurality of languages and a number of locations each of the plurality of languages are spoken. The language processing unit may determine that the location of the device is at a location for the particular language not included in the language database. If a determination is made that the location of the device is a new location for the particular language, the process then updates the language database with the new location of the particular language (operation 812). For example, the location of the device may be stored in the language database as one of a number of locations the particular language is spoken.

The process then provides a translation of the oral statement (operation 814), with the process terminating thereafter. In operation 814, a translation unit such as translation unit 306 in FIG. 3 may provide the translation of the oral statement. For example, the translation unit may access a translation database as translation database 332 in FIG. 3 to provide the translation of the oral statement. Further, the translation of the oral statement may be provided in a user interface such as user interface 308 in FIG. 3.

Figure 9:
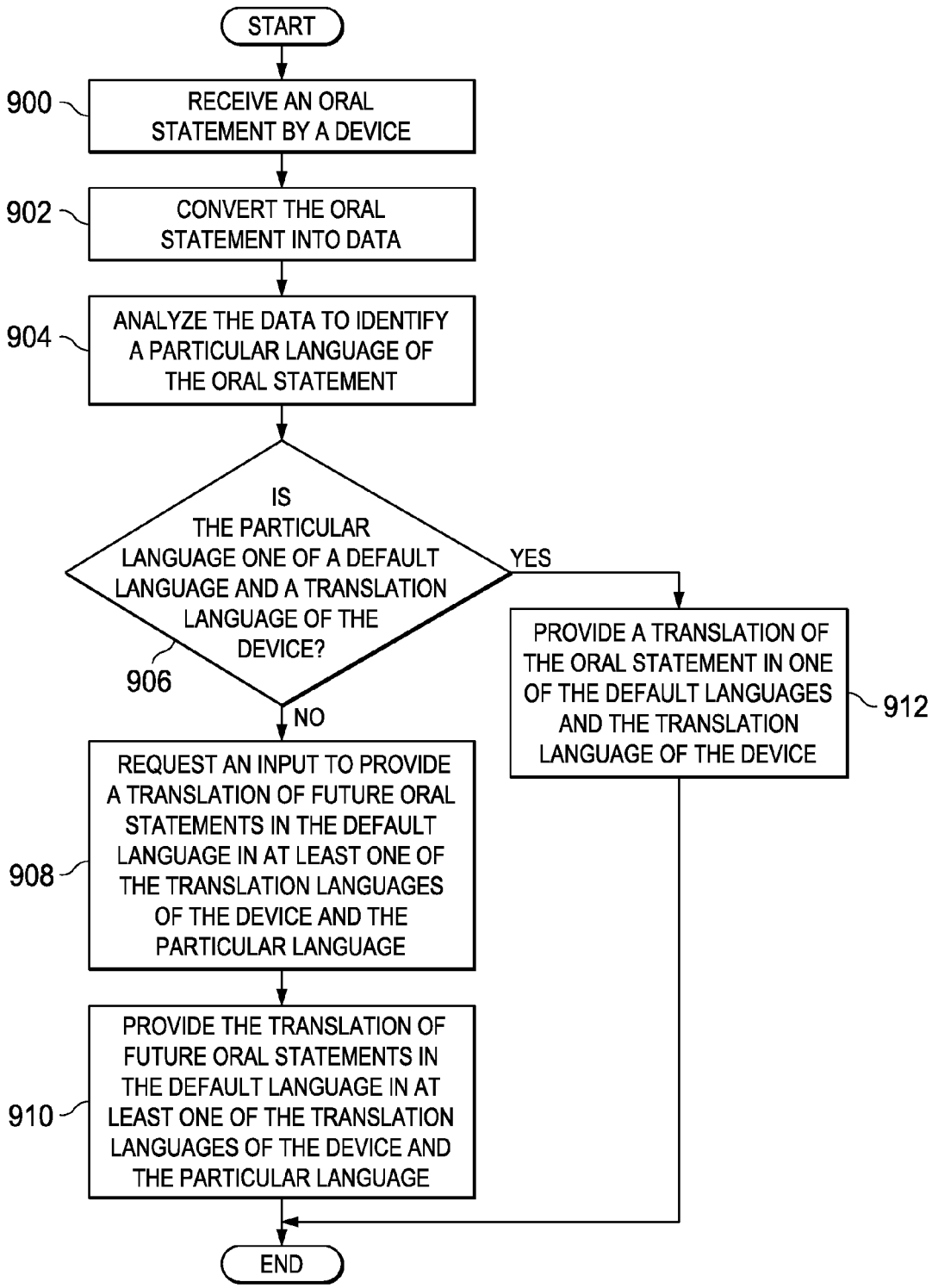
FIG. 9 is a flowchart of a process for translating oral statements among a plurality of languages in accordance with an illustrative embodiment.

With reference now to FIG. 9, an illustration of a flowchart of a process for translating oral statements among a plurality of languages is depicted in accordance with an illustrative embodiment. The process illustrated in FIG. 9 may be implemented in a language translation environment, such as language translation environment 300 in FIG. 3. The process begins by receiving an oral statement by a device (operation 900). The process converts the oral statement into data (operation 902). The process then analyzes the data to identify a particular language of the oral statement (operation 904). Operations 900, 902, and 904 may be examples of implementations of operations 600, 602, and 604 in FIG. 6.

Thereafter, the process determines whether the particular language is one of a default language and a translation language of the device (operation 906). In operation 906, the translation language may be based upon a location of the device or a user selection of a translation language. The translation language may also be automatically updated by an operation such as operation 718 in FIG. 7. The default language may be a default language such as default language 322 in FIG. 3.

If a determination is made that the particular language is not one of the default language and the translation language of the device, the process then requests an input to provide a translation of future oral statements in the default language in at least one of the translation language of the device and the particular language (operation 908). In operation 908, the process may determine that the particular language is neither the default language nor the translation language of the device. This may be a situation where there are more than two languages being spoken in a single conversation. The process may request an input from a user of the device to enter a "conference mode" where statements may be translated from and into a plurality of languages. The user input may be requested and/or received in a user interface such as user interface 308 in FIG. 3.

The process then provides the translation of future oral statements in the default language in at least one of the translation language of the device and the particular language (operation 910), with the process then terminating thereafter. In operation 910, the translation may be provided in either or both of the translation language of the device and the particular language based upon the user input. For example, the user may provide an input to have certain statements translated into both languages or certain statements translated into only one of the languages. Thus, the user may control which statements are translated into which languages when speaking with persons that understand different languages. Further, there may be multiple translation languages of the device that the device may translate oral statements in the default language into. For example, the user of the device may be speaking with more than two persons that each understand different languages. The process may provide a translation of future oral statements in the default language in any number of different translation languages. Additionally, for oral statements not spoken in the default language, the process may translate these oral statements into the default language regardless of whether the particular language of the oral statement is a translation language of the device. These processes and operations may be illustrated by operations 708 and 714 in FIG. 7, for example.

If a determination is made that the particular language is one of the default language and the translation language of the device, the process then provides a translation of the oral statement in one of the default language and the translation language of the device (operation 912), with the process then terminating thereafter. In operation 912, the language the translation of the oral statement is provided in may be determined by operations such as operations 708 through 718 in FIG. 7. For example, the process may determine that the particular language is the default language. In this case, the translation of the oral statement may be provided in the translation language of the device, such as in operation 712 in FIG. 7, for example. Alternatively, the process may determine that the particular language is the translation language of the device. In this case, the process may provide the translation of the oral statement in the default language, such as in operation 714 in FIG. 7, for example. The translation of the oral statement may be provided in a user interface such as user interface 308 in FIG. 3.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the different illustrative embodiments provide for a self-configuring language translation device. The translation device is capable of translating a plurality of different oral statements into a number of different languages. The translation device analyzes the oral statement to determine a particular language spoken in the oral statement. The determination of the language spoken in the oral statement allows the translation device to self-configure translations into appropriate languages.

The translation device may also determine a location that a particular language is spoken. This information may be included into databases containing information regarding places where different languages are spoken. The continual updating by the translation device of such databases allows for greater knowledge about languages and places where such languages are spoken.

The translation device may further be configured to determine voice inflections in the oral statements received. These voice inflections may be provided to a user of the translation device. Thus, the translations provided by the translation device may contain greater information than just a word by word translation of the oral statement. These translations may provide information regarding the mood, age, and/or gender of the speaker of the oral statement. Further, any and all of these processes discussed may be performed automatically. These processes may be performed by the translation device without the need for any human input or intervention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for translating oral statements, the method comprising:
    receiving, by a hand held wireless device, an oral statement;
    converting the oral statement into data;
    analyzing, by a processing unit within the device, the data to identify a particular language of the oral statement;
    determining whether the particular language is a configured translation language in the processing unit within the device to use to translate the oral statement;
    in response to determining that the particular language is not the configured translation language in the processing unit within the device, automatically updating the translation language of the device with the particular language from a remote language database to reconfigure the translation language in the processing unit within the device to use to perform translations with the device;
    in response to determining that the particular language is the configured translation language of the device, validating the translation language of the device; and
    providing a translation of the oral statement.

2. The method of claim 1 further comprising:
    determining a location of the device;
    responsive to identifying the particular language of the oral statement, determining whether the particular language is a default language;
    responsive to determining that the particular language is the default language, determining a translation language of the device based on the location of the device, and providing the translation of the oral statement in the translation language of the device; and
    responsive to determining that the particular language is not the default language, providing the translation of the oral statement in the default language.

3. The method of claim 2 further comprising:
    responsive to identifying the particular language of the oral statement, determining whether the particular language is one of the default language and the translation language of the device;
    responsive to determining that the particular language is not one of the default language and the translation language of the device, requesting an input to update the translation language of the device with the particular language; and
    responsive to receiving the input, updating the translation language of the device with the particular language.

4. The method of claim 2 further comprising:
    responsive to identifying the particular language of the oral statement, determining whether the particular language is one of the default language and the translation language of the device;
    responsive to determining that the particular language is not one of the default language and the translation language of the device, requesting an input to provide a translation of future oral statements in the default language in at least one of the translation language of the device and the particular language; and
    responsive to receiving the input, providing the translation of future oral statements in the default language in at least one of the translation language of the device and the particular language.

5. The method of claim 1 further comprising:
    responsive to determining that the particular language is the configured translation language of the device, automatically validating the translation language of the device.

6. The method of claim 1, wherein the step of analyzing, by a processing unit connected to the device, the data to identify a particular language of the oral statement comprises:
    determining a location of the device;
    searching a language database to identify the particular language based on the oral statement and the location of the device, wherein the language database stores data associated with a plurality of languages and a number of locations that each of the plurality of languages are spoken; and
    responsive to identifying a new location for the particular language, updating the language database with the new location of the particular language.

7. The method of claim 1, wherein the translation of the oral statement is provided in at least one of a text display and an audio display.

8. The method of claim 1 further comprising:
    determining, by a biometrical device, a voice inflection of the oral statement; and
    providing the voice inflection of the oral statement in at least one of a visual display and an audio display.

9. An apparatus comprising:
a handheld wireless input device configured to receive an oral statement;
a language processing unit within the device configured with a translation language to convert the oral statement into data and to analyze the data to identify a particular language of the oral statement;
the language processing unit further configured to determine whether the particular language is a configured translation language of the language processing unit within the device to use to translate the oral statement, and in response to determining that the particular language is not the configured translation language of the device, automatically updating the translation language of the device with the particular language from a remote language database to reconfigure the translation language of the device to use to perform translations with the device, and in response to determining that the particular language is the configured translation language of the device, validating the translation language of the device; and
a translation unit configured to provide a translation of the oral statement.

10. The apparatus of claim 9 further comprising:
a positioning system configured to determine a location of the input device; wherein the language processing unit is configured to determine whether the particular language is the default language and to determine the translation language based on the location of the input device, in response to determining that the particular language is the default language and wherein the translation unit is configured to provide the translation of the oral statement in the translation language, in response to determining that the particular language is the default language, and to provide the translation of the oral statement in the default language, in response to determining that the particular language is not the default language.

11. The apparatus of claim 10, wherein the language processing unit is configured to determine whether the particular language is one of the default language and the translation language, in response to identifying the particular language of the oral statement, to request an input to update the translation language with the particular language, in response to determining that the particular language is not one of the default language and the translation language, and to update the translation language with the particular language, in response to receiving the input.

12. The apparatus of claim 10, wherein the language processing unit is configured to determine whether the particular language is one of the default language and the translation language, in response to identifying the particular language of the oral statement, and to request an input to provide a translation of future oral statements in the default language in at least one of the translation language and the particular language, in response to determining that the particular language is not one of the default language and the translation language and wherein the translation unit is configured to provide the translation of future oral statements in the default language in at least one of the translation language and the particular language, in response to receiving the input.

13. The apparatus of claim 9, wherein the language processing unit is further configured to respond to determining that the particular language is the configured translation language of the device by automatically validating the translation language of the device.

14. The apparatus of claim 9 further comprising:
a positioning system configured to determine a location of the input device; and
a language database configured to store data associated with a plurality of languages and a number of locations that each of the plurality of languages are spoken, wherein the language processing unit is configured to search the language database to identify the particular language based on the oral statement and the location of the input device and wherein the language processing unit is configured to update the language database with a new location of the particular language in response to identifying the new location for the particular language.

15. The apparatus of claim 9 further comprising:
a user interface configured to provide the translation of the oral statement in at least one of a text display and an audio display; and
a biometrical device configured to determine a voice inflection of the oral statement and to provide the voice inflection of the oral statement in the user interface in at least one of a visual display and an audio display.

16. A computer program product comprising:
a computer readable storage medium storing a plurality of instructions for translating statements;
instructions, stored on the computer readable storage medium for receiving an oral statement at a handheld wireless device;
instructions for converting the oral statement into data;
instructions for analyzing the data using a language processing unit within the device to identify a particular language of the oral statement;
instructions for determining whether the particular language is a configured translation language in the language processing unit within the device to use to translate the oral statement, and in response to determining that the particular language is not the configured translation language in the processing unit within the device, automatically updating the translation language of the device with the particular language from a remote language database to reconfigure the translation language in the language processing unit within the device to use to perform translations with the device and in response to determining that the particular language is the configured translation language of the device, validating the translation language of the device; and
instructions for providing a translation of the oral statement.

17. The computer program product of claim 16 further comprising:
instructions for determining a location of the device;
instructions for determining whether the particular language is a default language, in response to identifying the particular language of the oral statement;
instructions for determining a translation language of the device based on the location of the device and providing the translation of the oral statement in the translation language of the device, in response to determining that the particular language is the default language; and
instructions for providing the translation of the oral statement in the default language, in response to determining that the particular language is not the default language.

18. The computer program product of claim 17 further comprising:
instructions for determining whether the particular language is one of the default language and the translation language of the device, in response to identifying the particular language of the oral statement;

instructions for requesting an input to update the translation language of the device with the particular language, in response to determining that the particular language is not one of the default language and the translation language of the device; and instructions for updating the translation language of the device with the particular language, in response to receiving the input.

19. The computer program product of claim 17 further comprising:

instructions for determining whether the particular language is one of the default language and the translation language of the device, in response to identifying the particular language of the oral statement;

instructions for requesting an input to provide a translation of future oral statements in the default language in at least one of the translation language of the device and the particular language, in response to determining that the particular language is not one of the default language and the translation language of the device; and instructions for providing the translation of future oral statements in the default language in at least one of the translation language of the device and the particular language, in response to receiving the input.

20. The computer program product of claim 16 further comprising:

instructions for responding to determining that the particular language is the configured translation language of the device by automatically validating the translation language of the device.

21. The computer program product of claim 16, wherein the instructions for analyzing the data to identify a particular language of the oral statement comprise:

instructions for determining a location of the device;

instructions for searching a language database to identify the particular language based on the oral statement and the location of the device, wherein the language database stores data associated with a plurality of languages and a number of locations that each of the plurality of languages are spoken; and instructions for updating the language database with a new location of the particular language, in response to identifying the new location for the particular language.

22. The computer program product of claim 16 further comprising:

instructions for determining, by a biometrical device, a voice inflection of the oral statement;

instructions for providing, in a user interface, the voice inflection of the oral statement in at least one of a visual display and an audio display; and instructions for providing, in a user interface, the translation of the oral statement in at least one of a text display and an audio display.

* * * * *